United States Patent [19]

Catlett et al.

[11] 4,006,392
[45] Feb. 1, 1977

[54] ELECTRONIC SLIDING DOOR

[76] Inventors: John C. Catlett, 8735 N. 72nd St., Milwaukee, Wis. 53223; James A. Blake, 5354 S. 116th St., Hales Corners, Wis. 53130

[22] Filed: Sept. 2, 1975

[21] Appl. No.: 609,508

[52] U.S. Cl. .............................. 318/266; 318/283; 318/467

[51] Int. Cl.$^2$ .............................. G05D 3/08

[58] Field of Search ........ 318/257, 258, 259, 281, 318/283, 265, 266, 466, 467

[56] References Cited

UNITED STATES PATENTS

| | | | |
|---|---|---|---|
| 3,728,605 | 4/1973 | Purtilo | 318/467 X |
| 3,813,590 | 5/1974 | Ellmore | 318/266 |
| 3,891,909 | 6/1975 | Newson | 318/467 X |

*Primary Examiner*—B. Dobeck
*Attorney, Agent, or Firm*—Ralph W. Kalish

[57] ABSTRACT

An electronic door control system is disclosed having a d.c. motor rotatable in one direction for opening a door and in the opposite direction for closing the door. One or more semiconductor devices (preferably SCR's) supply d.c. power to the motor from an a.c. power source when rendered conductive. A polarity selecting circuit controls the polarity of d.c. power supplied to the motor and thus its rotational direction. A sensor (e.g. floor mat) senses body pressure near the door to enable conduction of the semiconductor device and provide a first d.c. power polarity for a predetermined period to open the door. A circuit reverses the polarity after the door is opened, thereby closing the door. A speed control circuit responsive to counterelectromotive force developed by the motor effectively controllably varies the conductivity of the semiconductor device in a sense tending normally to cause motor rotation, and thereby door movement, at a predetermined speed. Preferably, this speed control circuit also operated in response to change in said counterelectromotive force caused by door blockage to effectively reduce the conductivity of the semiconductor device whereby motor rotation, and thus door movement, is stopped as long as the door blockage is present.

11 Claims, 28 Drawing Figures

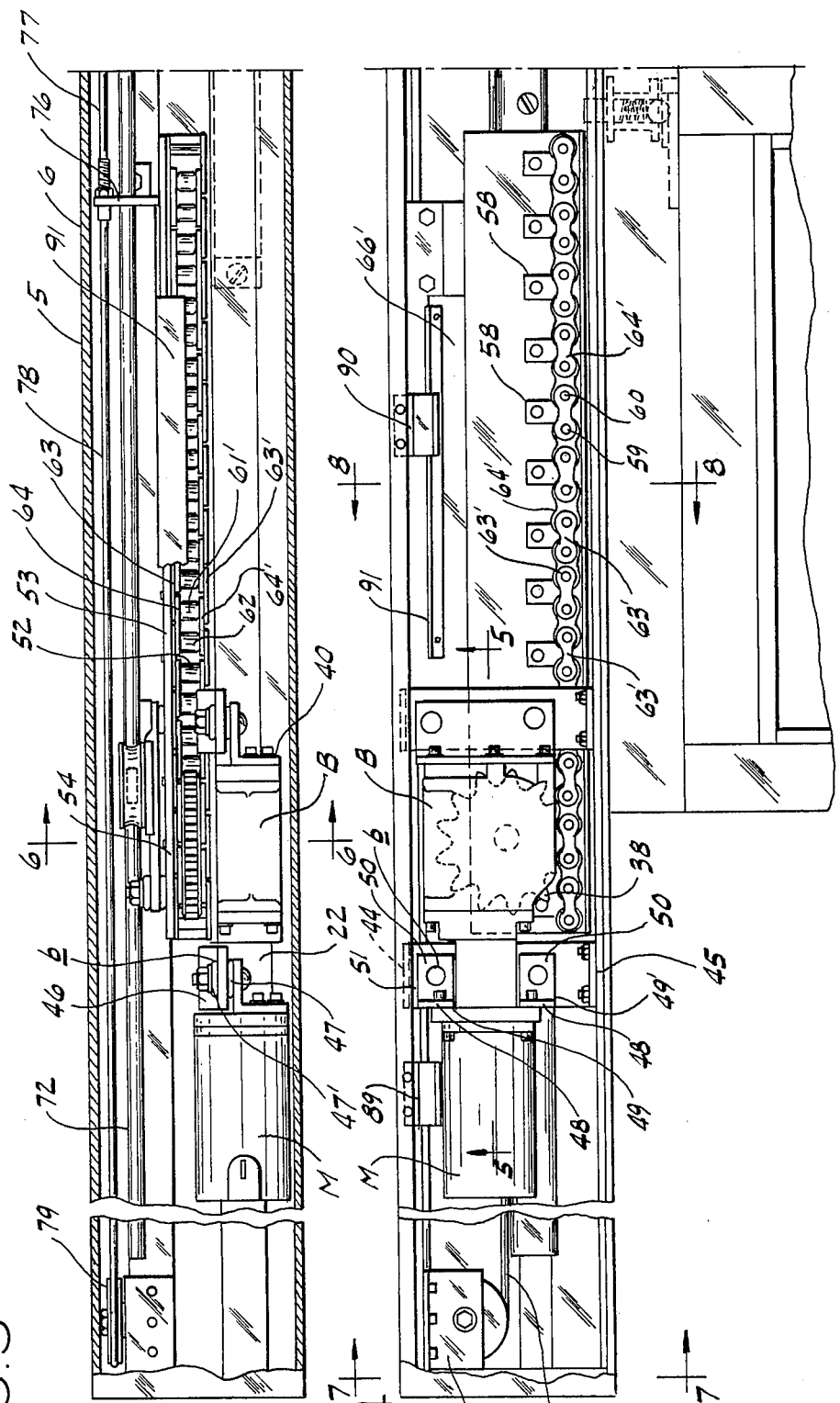

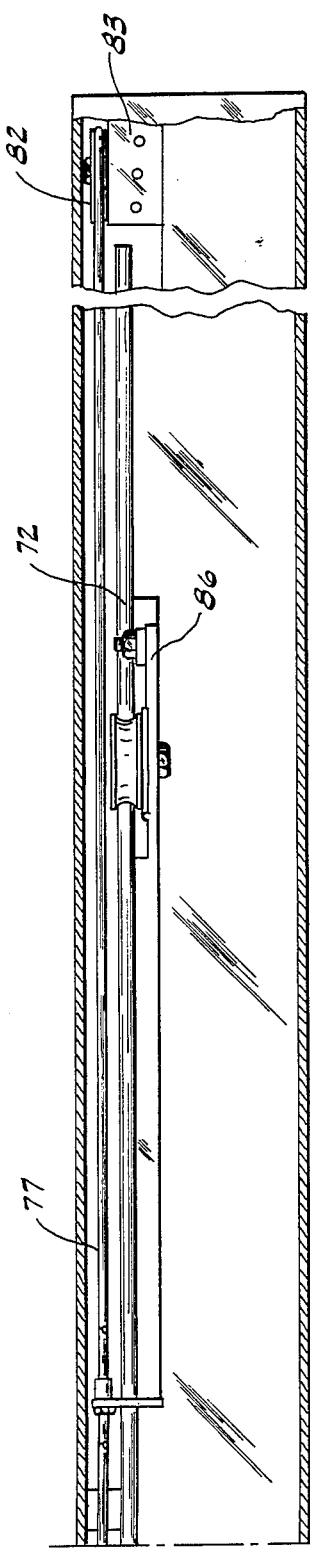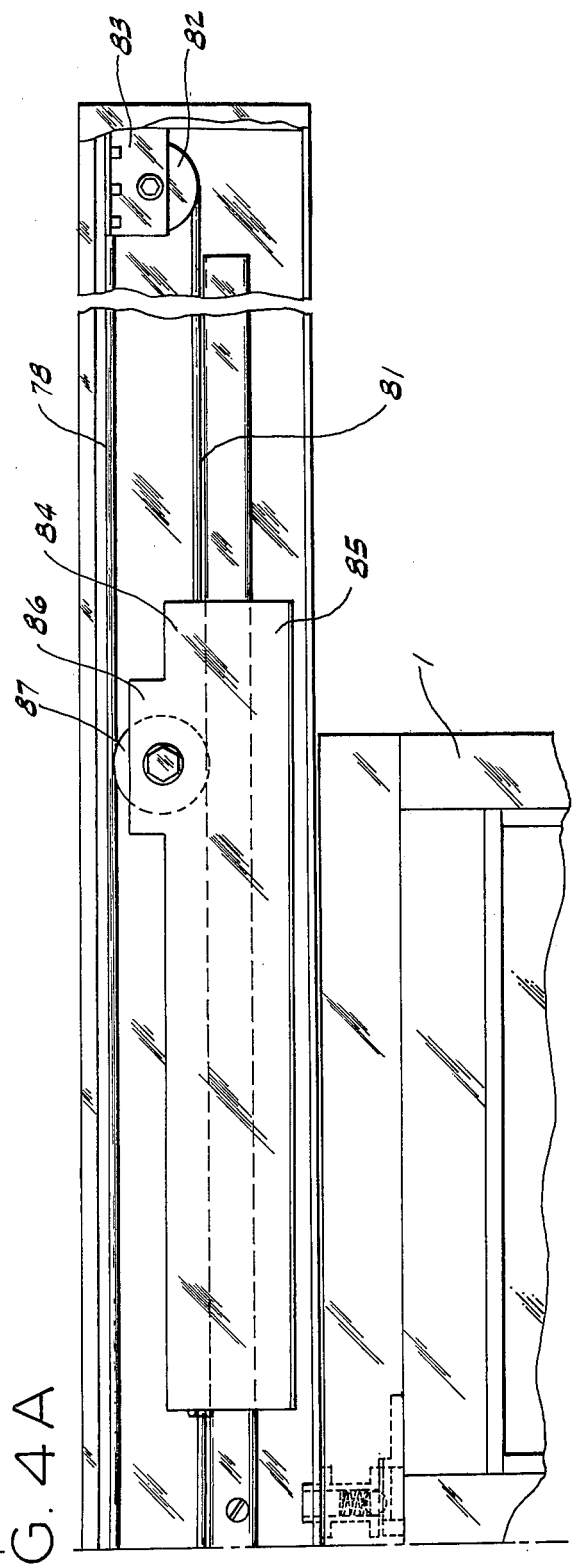

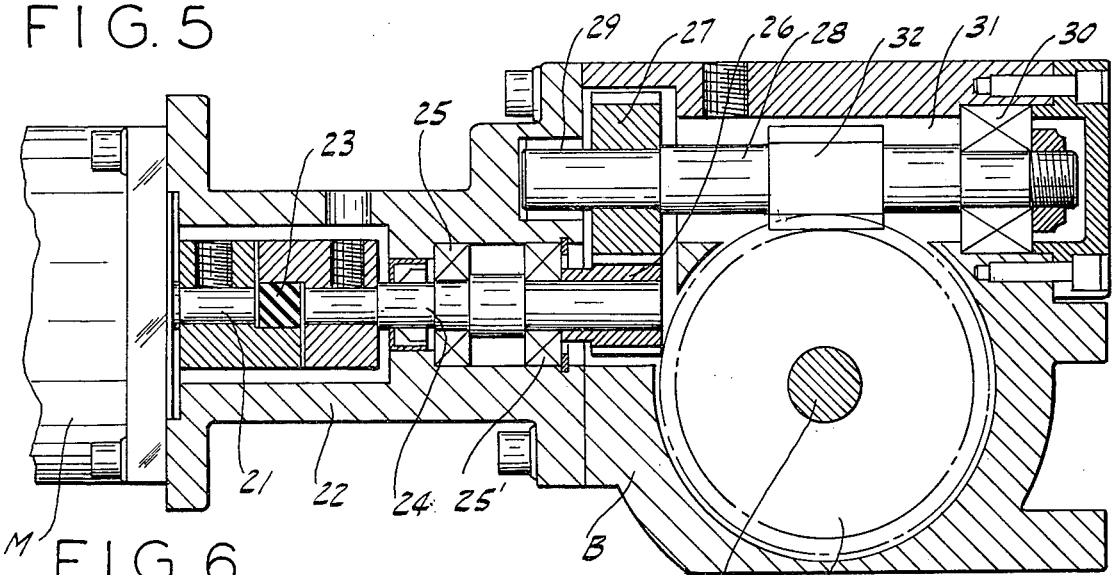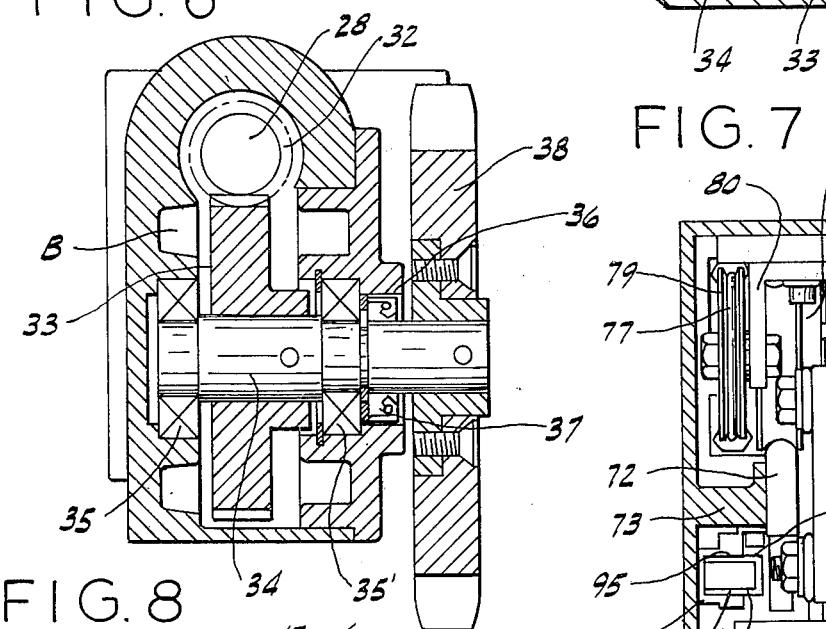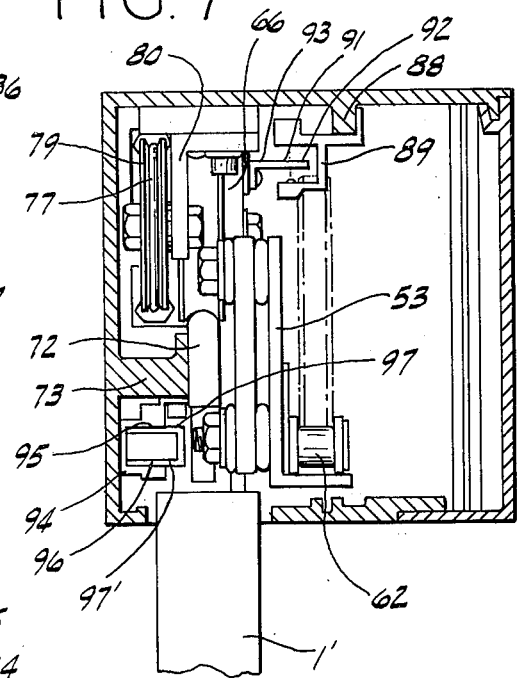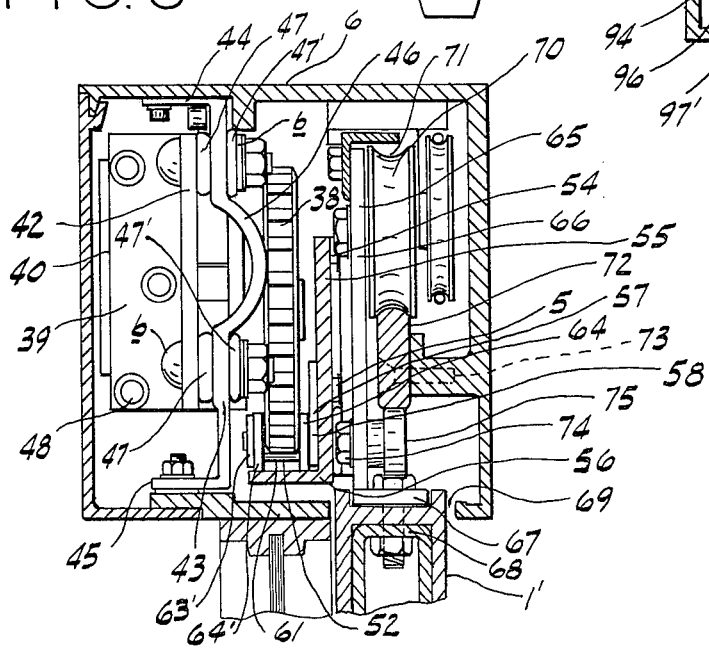

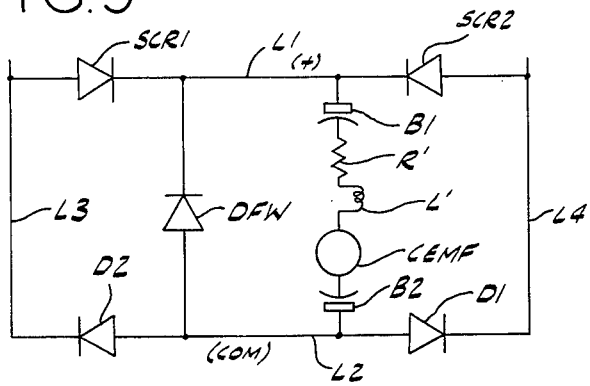
FIG.9
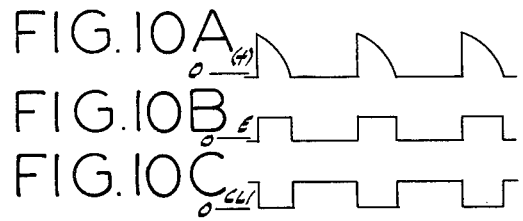
FIG.10A
FIG.10B
FIG.10C
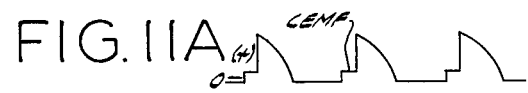
FIG.11A
FIG.11B
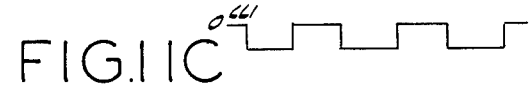
FIG.11C
FIG.12A
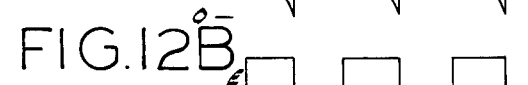
FIG.12B
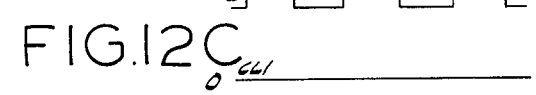
FIG.12C
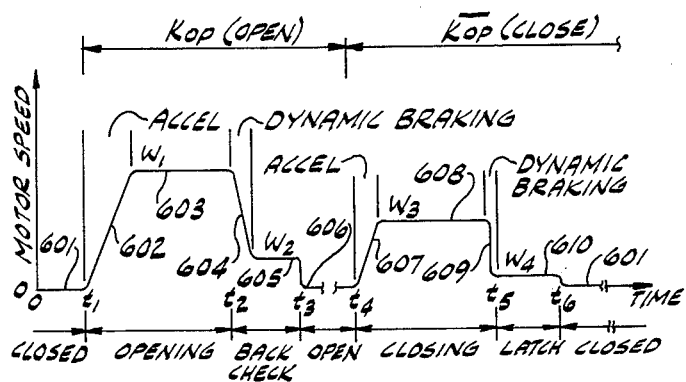
FIG.14
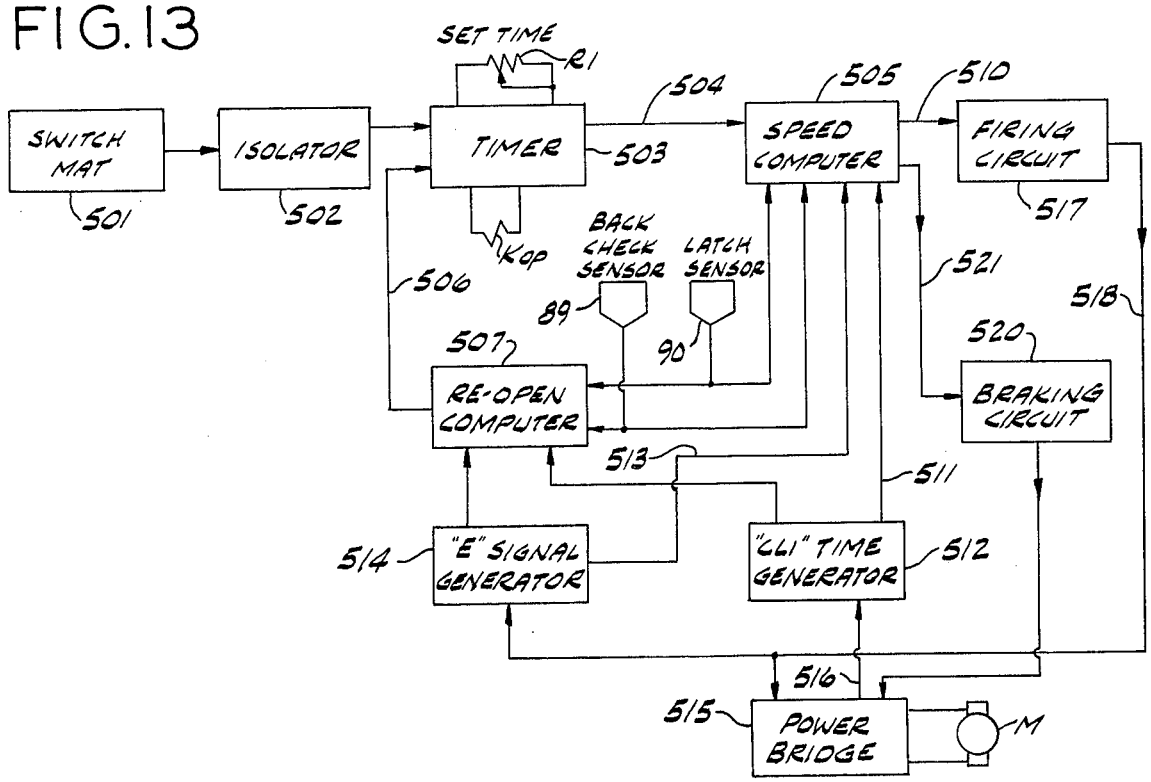
FIG.13

ELECTRONIC SLIDING DOOR

BACKGROUND AND SUMMARY OF THE INVENTION

This invention relates in general to entrance systems and, more particularly, to an automatic sliding door entrance. The invention is particularly concerned with an entrance system having solid-state electronic control circuitry for controlling the energization of a d.c. electrical motor for operating doors of the system.

An object of the invention is the provision of a solid-state electronic door control system having a d.c. electric motor for operating a door and a semiconductor device for supplying d.c. power to the motor wherein speed control of the motor is effected by sensing the counterelectromotive force developed by the motor.

Another object of the invention is the provision of such an electronic door control system in which change in said counterelectromotive force produced by door blockage is sensed to cause d.c. power supplied to the motor to be reduced for stopping door movement.

A further object of the invention is the provision of such an electronic door control system in which various positions of the door during opening or closing are sensed to change the level of d.c. power supplied to the motor for changing door movement speed accordingly.

A still further object of the present invention is the provision of such an electronic door control system in which door blockage during door closing is electronically sensed to cause a door opening and reclosing cycle to be initiated.

Another object of the present invention is the provision of such an electronic door control system in which nearly opened and nearly fully closed position of the door are electronically sensed and conductivity of the semiconductor device is effectively varied in order to reduce the motor speed and thereby a door speed at such positions.

It is a still further object of the present invention to provide an electronic door control system which embodies novel control means for causing variation in the speeds of door opening and door closing movements for promoting both safety and relatively repair-free longevity of use.

It is another object of the present invention to provide a system of the character stated which is readily adapted for doors of the double leaf or the single leaf type and which systems are particularly amenable to presentation in attractive, ornamental design.

It is a still further object of the present invention to provide a system of the character stated which is constituted of relatively few components, all of which are of durable, wear-resistant construction; and which system incorporates easily manipulated means for appropriately adjusting components to assure of effective operation of the system without requiring the customary dismantling procedure with attendant down-time.

BRIEF DESCRIPTION OF THE DRAWINGS

FIGS. 3 and 3A jointly constitute a top plan view of the header with the cover panel removed; this view being taken as indicated by the arrow in FIG. 1.

FIGS. 4 and 4A jointly constitute a vertical sectional view taken on the line 4—4 of FIGS. 3 and 3A.

FIG. 5 is a horizontal transverse sectional view taken on the line 5—5 of FIG. 4.

FIG. 6 is a vertical transverse sectional view taken on the line 606 of FIG. 3.

FIG. 7 is a vertical transverse sectional view taken on the line 7-7 of FIG. 4.

FIG. 8 is a vertical transverse sectional view taken on the line 8—8 of FIG. 4.

FIG. 9 is a schematic diagram which represents the electrical equivalent circuit of a d.c. motor of the present system as connected for operation in a power bridge of the door motor control circuitry of the invention.

FIGS. 10A, 10B, and 10C depict respective waveforms of certain important or key signals of the motor control circuitry when the door motor is in an energized but stalled mode occurring at times during operation of the system.

FIGS. 11A, 11B, and 11C depict respective waveforms of the three key signals shown in FIGS. 10A - 10C when the door motor is in a lightly loaded, slow-running mode occurring at other times during system operation.

FIGS. 12A, 12B, and 12C depict respective waveforms of these three key signals when the door motor is in a lightly loaded, but fast-running mode occurring at still other times during system operation.

FIG. 13 is a block diagram illustrating salient portions of the door motor control circuitry.

FIG. 14 is an operational mode timing diagram representatively illustrating the various modes of system operation as they occur at different times.

DESCRIPTION OF THE PRACTICAL EMBODIMENTS

Figure 1:
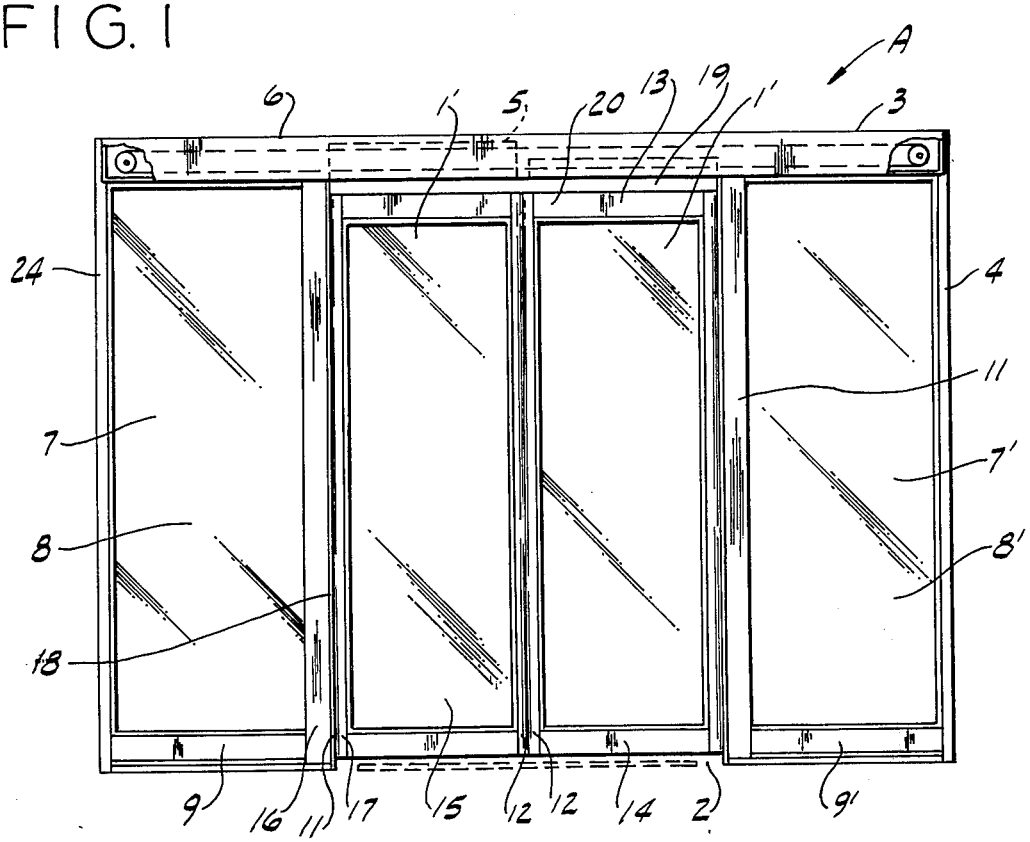
FIG. 1 is an elevational view of a sliding door system constructed in accordance with and embodying the present invention, illustrating a door of the double leaf type.

Referring now by reference characters to the drawings which illustrate practical embodiments of the present invention, A generally designates an automatic sliding door system which may be of the double leaf type, in comprising a pair of cooperative, vertically disposed, horizontally aligned sliding doors 1,1' adapted for edge-to-edge abutment in flush arrangement when closed (see FIG. 1) and, hence, being movable away from each other for door opening. It will be apparent hereinbelow that the system of the present invention may also be only of the single leaf type having but one slideable door movable toward and away from a door jamb during closing and opening operation. However, for purposes of exposition herein, the double leaf type will be described.

Doors 1,1' are, accordingly, designed for closure of an opening 2 provided within an entrance structure, generally indicated 3, located within a wall opening; said structure 3 incorporates spaced apart vertical jambs 4,4' as fabricated of extruded metal stock, and with portions (not shown) being receivable within the wall structure. Extending transversely of wall opening 3 and, hence, of door opening 2, is a header 5 suitably supported upon the upper ends of jambs 4,4' and affixed to the overhead structure (not shown). Header 5, which is also desirably fabricated of sheet metal constitutes a housing 6, with there being a removable top cover panel (not shown) for allowing of ready access to the interior of housing 6. Entrance structure 4 also includes so-called screens 7,7' which are coplanar, and the inner margins of which define the edges of opening 2. Each screen 7,7' is suitably engaged to header 5, as well as to the proximate jambs 4,4'; and with there being a bottom rail 9,9', respectively, and marginal verticals, as at 10,10', respectively, parallel to jambs 4,4' which constitute borders of opening 2. The details of the installation are not described in detail since such would be in accordance with conventional practice.

Figure 2:
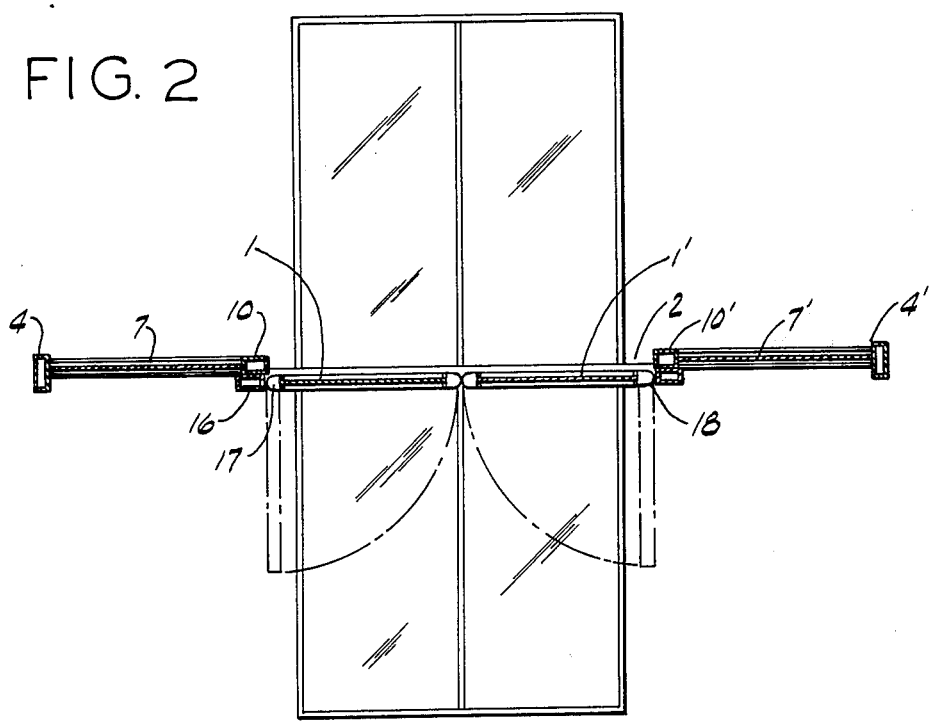
FIG. 2 is a view taken substantially along the line 2—2 of FIG. 1.

As may best be seen in FIG. 2, screens 7,7' are presented within a plane parallel to the plane of movement of doors 1,1' so that the latter in moving from closed into opened condition, will travel into substantially registering relationship with the related screen 7,7'; it being recognized that the width of header 5 is greater than the combined thickness of the related screens and doors so that the same will, as shown below, accommodate the door operating components, as well as provide a suitable finish to the structure 3. It is recognized that although screens 7,7' are shown as comprising transparent panels 8,8', respectively, the same may be of solid, opaque materials, such as wood and the like, if desired, for decorative purposes.

In actual practice, entrance structure 3 will be presented with relation to the adjacent wall so that screens 7,7' will be located on what might be considered the outer side of such wall. Consequently, the view in FIG. 1 may be considered from the inside of said structure 3.

Each door 1,1' comprises vertical rails 11,12 and upper and lower rails 13,14, respectively, which are desirably formed of extruded metal and adapted to support a transparent panel 15 as of glass. As shown in the drawings, door rails 11 are of two-part character comprising a support component 16 and a companion component 17, with the same being interengaged as by spaced hinges 18; and with each upper rail 13 being also of two-part construction having top and bottom cooperating components 19,20; said top component 19 being rigid at its ends with the adjacent support component 16. This particular construction of the said door leaves 1,1' is for the purpose of permitting same to swing, as indicated in phantom lines in FIG. 2, under so-called panic or emergency conditions. This capability will be discussed more fully hereinbelow, but for purposes of description of the slideable operation of doors 1,1', the referred to door rails will be considered unitarily for simplicity purposes.

Doors 1,1' are provided with overhead suspension and there being means for automatically sliding said doors 1,1' between opened and closed position through actuation of a conveniently located switch or other control, such as, for example, flow switch mats, photoelectric cells, sonic switches, wall switches, remote switching systems, and the like, so that normal door operation does not require any conscious manipulation by door users.

Referring now to FIGS. 3-8, inclusive, it will be seen that there is provided within header housing 6 a compact power system operable from a convenient source of electrical energy. The header contained portion of the power system incorporates a motor M, as of the direct current, permanent magnet type, having a drive shaft 21 receivable within an extension 22 of a gearbox B for engagement by a coupling 23 to a driven shaft 24 journalled in ball bearings 25,25' in the remote end of said extension for projection of its motor remote end into said gearbox B and mounting a drive gear 26, of helical form, for meshing with a pinion 27 carried on one end portion of a stub shaft 28. Said shaft 28 is journalled in a needle bearing 29 provided in a suitable recess within the upper wall portion of gearbox B and at its other end within a ball bearing 30 suitably mounted within the opposed wall portion of said gearbox B so that said shaft 28 extends longitudinally of said gearbox B and through the central compartment 31 thereof. Mounted for rotation upon stub shaft 28 substantially intermediate its length, is a worm gear 32, the lower portion of which meshes with the upper peripheral portion of a drive sprocket gear 33 splined or otherwise rigidly mounted upon a shaft 34, which latter is axially perpendicular to, and located spacedly beneath, stub shaft 28 and being journalled within ball bearings 35,35' suitably fixed within gearbox B and with the normally forward end of said shaft 34 projecting through an opening 36 in said gearbox B which opening mounts an oil seal 37 in encircling relationship to said shaft 34. At its forward projecting end shaft 34 mounts a drive sprocket 38 for purposes presently appearing. With particular reference to FIGS. 3 and 8, it will be seen that at its motor remote end, gearbox B is secured to one flange 39 of an angle shaped bracket 40, as by screws 41, the other or perpendicular flange 42 of which is engaged, as by bolts b, to a support member 43 having upper and lower flanges 44,45 being suitably engaged, as by screws, to the upper and lower wall sections of header housing 6. Said support member 43 is of bowed or forwardly convex formation in its generally central portion, as at 46, for enhancing the strength thereof. Disposed about bolts b between flange 42 and member 43, and between member 43 and retaining nuts, are resilient, shock absorbing elements 41,47' to protect the drive system against inadvertent misalignment or damage by reason of any jarring or other forces encountered during door operation. Fixed, as by screws, to the end face of motor M proximate gearbox B above and below gearbox extension 22 are the flanges 48 of upper and lower angle brackets 49,49', the other flanges 50 of which are fixed, as by bolts b, to a companion support member 51 which is of identical construction as support member 43, having upper and lower flanges 44,45, for affixation to the upper and lower portions, respectively, of header housing 6, and with a substantially central bowed or forwardly convex, rigidifying portion 46; there being resilient shock absorbing components 47,47' encircling each bolt b. It will thus be seen that said support members 43,51 provide a unique mounting for motor M and gearbox B, and being located on either side of drive sprocket 38 sufficiently laterally and rearwardly thereof so as not to interfere with the operation of the latter.

Drive sprocket 38 in its lower portion engages rollers 52 of a fixed roller chain section 53 comprising a chain carrier 54 including an elongated vertical plate 55 having a coextensive base flange 56 directed rearwardly, beneath drive sprocket 38 and secured to plate 55, as by bolts 57, on its rearward surface are the upper ends of a series of longitudinally spaced roller mounting brackets 58, each of which is relatively widened in its lower portion to fixedly carry a pair of short, rearwardly extending, axially parallel roller shafts 59,60 which mount rollers 61,62, respectively. Said shafts project through aligned openings in inner and outer aligned side plates 63,63' and inner and outer articulating plates 64,64' which latter serve to interconnect the roller 61 with the roller 62 of the next adjacent roller set. Thus, said plates 64,64' serve to integrate the rollers 61,62 associated with each mounting bracket 58 with the remaining rollers to thereby present the integrated fixed roller chain section 53. As is evident, rollers 61,62 are fixed so that upon rotation of sprocket 58, whereby its teeth will be received adjacent rollers, the entire roller section is movable longitudinally of header 5 as will be shown more fully hereinbelow. Chain carrier plate 55 is fixed in its opposite end portions to the vertical sections 65 of door carriers 66,66', each of which at their lower ends carry base flanges 67 for engagement by any suitable means, such as by bolts 68, to the upper ends of door 1'; said bolt 68 extending through suitable elongated slot-like openings 69 formed in the base of header housing 6 and being substantially coextensive therewith. Each door carrier 66 rotatably mounts, in its upper portion and on its forward side, a support roller 70 being formed of wear resistant material and having a grooved or concave periphery 71 for engaging a track 72, with a correspondingly convex upper peripheral surface for relative travel therealong of the said rollers 70. Track 72 is substantially coextensive with header 5 and is suitably mounted as upon a bracket 73 extruded from the inner face of the forward wall of housing 6. Mounted upon the forward face of vertical section 65 of each door carried 66, as by bolts 74, is an anti-riser roller 75 for engaging upon its upper peripheral surface the confronting bottom surface of track 72 so as to present inadvertent vertical shifting of door 1' and its associated carrier 66 thereby assuring of maintenance of proper operative relationship between roller 70 and track 72. Said door carrier 66' in its upper portion contains a forwardly extending boss 76 for rigid connection to the upper course 77 of an endless cable 78 which at its end proximate motor M extends about a pulley 79 support from an angle bracket 80 secured to the adjacent portions of header housing 6; said cable 78 having a lower course 81. From boss 76 the upper course 77 of cable 78 continues toward the end of header housing 6 remote from motor M for disposition about a pulley 82 similar to pulley 79 and being supported by a bracket 83 fixed to housing 6. The lower course 81 of cable 78 progresses from pulley 79 toward pulley 82, but is rigidly fixed to an elongated door carrier 84 having a lower base portion 85 for engagement to the upper end of door 1 and contains a boss 86 in its upper portion for mounting a support roller 87, being similar in all respects to support roller 70 and being engageable upon its lower peripheral surface with the upper surface of track 72. From door carrier 84 the lower course 81 of cable 78 progresses upwardly about pulley 82.

From the foregoing the basic operation of system A should be quite apparent. With doors 1,1' in closed condition, as shown in FIG. 1, the control switch, such as, for instance, located in a floor mat, is actuated and power is applied to motor M for energization of the same with the drive shaft being rotated for causing sprocket 38 to rotate through the described gear train within gearbox B. Thereupon through the interengagement of said drive sprocket 38 with rollers 61,62 of roller chain section 53, said latter will be caused to travel toward the proximate jamb with door carriers 66,66' and door carrier 84 moving respectively toward the adjacent ends of header housing 6 for causing doors 1,1' to move away from each other into open position. Thus, as the upper course 77 of cable 78 travels toward pulley 79, a pushing effect, as it were, will be applied to lower course 81 to assure of corresponding movement of door 1 which is, in effect, the slave door, in the opposite direction from travel of the main or driver door 1'. As will be shown more fully hereinbelow, by means of the novel control arrangement, doors 1,1' will be caused to decelerate in their opening movement as they approach full closed condition and will be caused to travel returningly into closed condition after withdrawal of the control switch closing force, such as by a person passing from the switch mat or the like; and with there being an operative arrangement for slowing the rate of travel of doors 1,1' in the late stage of the closing action. It will thus be seen that from the foregoing the incorporation of the drive sprocket 38 and the cooperating fixed roller section 53 constitutes a novel mechanical expedient for utilization with sliding doors as the engagement therebetween is positive and reliable and with a single combination thereof being adequate so that a corresponding unit is not required in conjunction with slave door 1.

With reference to FIG. 6 and FIG. 7 it will be seen that worm 32 and gear 33 are in combination a part of the reducer drive. In normal operation worm 32 drives gear 33 to move the doors 1,1' from closed to open position, and by reversing rotation return said door back from open to closed position. In the event of power failure or cutoff of power, it is necessary to be able to move doors 1,1' to any required position manually. This necessitates the gear 33 causing movement of worm 32. Although most worm gear drives cannot be operated in reverse, the present aforesaid elements have been designed so that the same can cooperate in reverse to obtain the required function as stated above. This function renders this gear system markedly distinct from other gear systems heretofore know.

As may best be seen in FIGS. 4 and 7, mounted upon a boss 88 depending from the top wall of header housing 6, is a back check control sensor 89, such as a solid state photocell switch, and disposed between pulley 79 and drive sprocket 38. A cooperating latch speed control sensor 90 is mounted similarly upon boss 88 spacedly from sprocket 38 and on the side thereof remote from sensor 89 (see FIG. 4). For cooperation with said sensors 89,90 is an elongated interrupter 91 as constituted of the horizontal flange 92 of a bracket 93 suitably mounted at its ends upon door carriers 66,66'. The operation of said sensors 89,90 will be described more fully hereinbelow.

Carried on the inside of housing 6 in its lower portion and beneath bracket 73 proximate the inner edge of door 1' is a panic break-away switch 94 of the solid state photocell character having a light emitting diode 95 light source which is normally blocked by a generally channel-shaped interrupter 96 which is urged by a spring (not shown) into light blocking disposition. When the door is forced, as through an emergency situation, the photocell of the switch 94 will no longer receive light from diode 95 through openings provided in the flanges 97,97' of said interrupter 96 as the same is shifted through stress being placed upon the said spring.

Referring now to FIG. 9, door motor M is represented by its electrical equivalent circuit during operation, i.e., as having in series a source of counter-electromotive force CEMF (i.e., the voltage induced in the motor winding as a function of motor rotation speed) an intrinsic motor winding inductance L', and an intrinsic motor winding resistance R'. The motor brushes are designated B1 and B2. Motor M and a so-called free wheeling diode Dfw are connected across a motor power lead L1 and a circuit common L2.

D.C. power is provided across these two leads for energizing the motor by a power bridge circuit comprising a pair of oppositely poled silicon controlled rectifiers (SCR's) designated SCR1 and SCR2 and corresponding oppositely poled diodes D1 and D2. The power bridge is connected across conventional a.c. power leads L3 and L4.

The SCR's are one of a family of related gate-triggerable semiconductor current switching devices sometimes referred to as thyristors. Although the gate drive circuits are not shown in FIG. 9, it will be understood that SCR1 and SCR2, if alternately triggered, i.e., gated, during successive a.c. half cycles, will energize door motor M; the average power to door motor M, and, hence, its speed, being a function of the phase of triggering during the a.c. half cycle. It will be understood that the conductivity of the SCR is, in effect, varied by changing the period of conduction in this way. Other types of semiconductor devices, such as bidirectional thyristors or transistors may instead by used.

Referring now to the block diagram constituting FIG. 13, the general principles of operation of the door motor control circuitry will be understood. At 501 is represented a switch mat of a conventional commercial type, which extends for a direction outwardly from either or both sides of the door to be operated. Switch mat 501 is preferably of the type comprising a normally open SPST switch adapted to close upon the weight of a person or other suitable object (such as a cart) on the mat when the doors are approached. An isolation circuit 502 electrically isolates switch mat 501 from a timer circuit 503. Of course, other types of detection devices, such as proximity detectors, push buttons, switches, etc. may be used for the same purpose as the switch mat.

The timer circuit is operative to control the energization of the winding of a relay Kop in response to the presence of a person or object on switch mat 501. Relay Kop determines the direction of movement of the doors, whereby it winding when de-energize permits rotation of door motor M in door-opening direction and, when energize, permits rotation of door motor M in the opposite, or door-closing direction. Energization of relay Kop for this purpose is continued for a time interval adjustable from several seconds to preferably about 30 seconds determined by the setting of a potentiometer R1. Timer circuit 503 also supplies a speed reference signal via a lead 504 to a speed computer circuit 505 so that doors 1,1' open at a rate faster than the rate at which they close.

Timer circuit 503 is adapted to be reset for a new timing cycle when it receives a timer reset signal via a lead 506 from a re-open computer circuit 507. This lead signal 506 is inhibited when back-check sensor 89 senses that doors 1,1' are nearly fully opened. Latch sensor 90 also inhibits the reset signal on lead 506 when doors 1,1' approach their closed, i.e. latched position; signals from sensors 89 and 90 are also supplied to speed computer circuit 505, for changing the speed output signal on lead 510 from the latter circuit when said doors approach either of the fully closed or fully open positions.

During the several phases of door operation, i.e., opening nearly fully opened, fully opened, closing, nearly fully closed, and fully closed, speed computer 505 is responsive to a signal referred to as $C_{L1}$ provided on a lead 511 by a circuit 512 and to a further signal on a lead 513 referred to as E generated by a circuit 514. For this purpose a feedback signal from a power bridge 515 (see FIG. 9) is provided by a lead 516 to the $C_{L1}$ signal generator 512. This feedback signal includes, of course, any component counter-electromotive potential (CEMF) that may be produced by door motor M when the latter is rotating under the conditions represented by FIGS. 11A and 12A.

The SCR's (see FIG. 9) of power bridge 515 are gated by a firing circuit 517, the output of which may be regarded as appearing on a lead 518. The firing or gating signal is also effectively provided as an input to the E signal generator as shown. Thus, it will be seen that the signal E generated by circuit 514 is a function of gating of the SCR1 and SCR2 for reasons and under conditions which will be more clearly understood from the description of FIGS. 15A and 15B below. However, for the present it is sufficient to note that the signal E (as well as signal $C_{L1}$) is supplied to re-open computer 507. Accordingly, when present, the signal E may, under certain conditions noted later, in combination with signal $C_{L1}$, cause said computer circuit 507 to cause doors 1,1' to re-open. This occurs if said doors should be blocked or their movement impeded when they are being closed by motor M.

Also shown in FIG. 13 is a braking circuit 520 which is operative in response to a braking signal on lead 521 from speed computer 505 when it is sensed that the door motor should be braked to retard the speed of door movement. While various braking arrangements are possible, it is preferred to electronically switch a braking resistor across the door motor, as will be understood from the description of FIGS. 15A and 15B.

Referring to FIG. 14, the general modes of operation will be understood. FIG. 14 represents a graph of motor rotational velocity as the ordinate plotted as a function of time as the abscissa. The closed condition of doors 1,1' is represented at 601, the motor speed being zero until a time $t_1$ representative of the moment pressure is placed on switch mat 501 sufficient to cause timer 503 to initiate a timing cycle and to energize the winding of relay Kop. Thus, during the segment 602, the motor speed accelerates to its highest normal speed $W_1$ and then remains substantially at this speed for a segment 603 until a time $t_2$ when back-check sensor 89 provides a signal to speed computer 505, which causes the motor speed to be reduced as shown by segment 604 through dynamic braking by braking circuit 520 until a relatively slow final opening speed $W_2$ is achieved indicated by segment 605. When the doors have fully opened at a time $t_3$, the motor speed goes to zero. The doors then remain open indicated by segment 606 until timer 503 has timed out the delay period set by the potentiometer R1.

Upon completion of the time delay, relay Kop is deenergized. This is indicated by the symbol Kop and occurs at time $t_4$. The, as shown by segment 607, motor speed increases as the doors begin closing to an intermediate value $W_3$ during segment 608. This speed is substantially maintained until time $t_5$ at which latch sensor 90 senses that doors 1,1' are nearly closed. Motor speed is then dynamically braked, indicated by segment 609 until a very low speed $W_4$ is attained. This value is then maintained, as shown by segment 532, until such time $t_6$ as the doors completely close. Motor speed is then zero once more during segment 601 until a complete opening and closing cycle is initiated against time $t_1$.

Figure 15A:
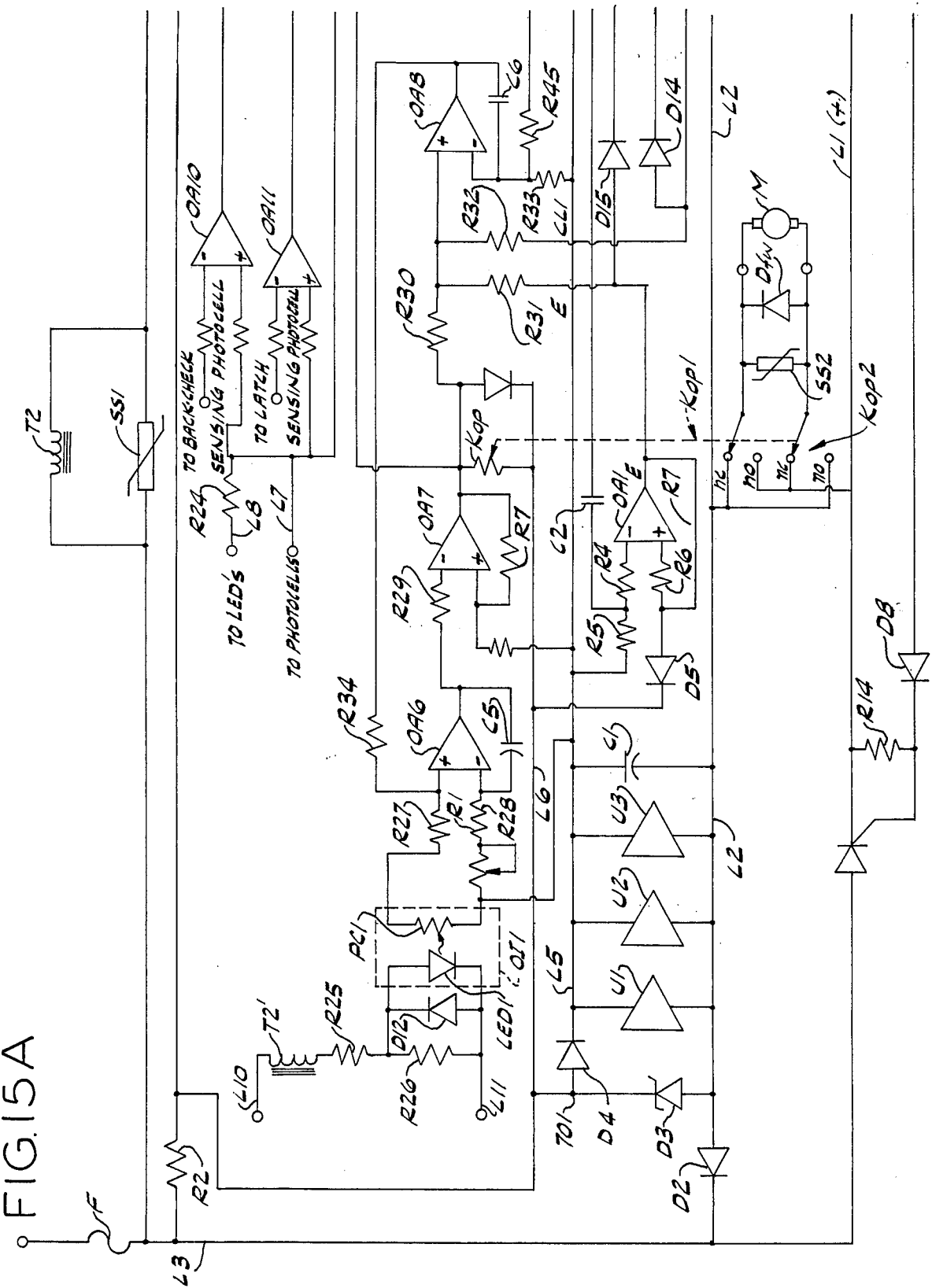
FIGS. 15A and 15B are two halves of a detailed schematic diagram of the door motor control circuitry, interconnections between the two circuit halves being shown by the alignment of leads.
Figure 15B:
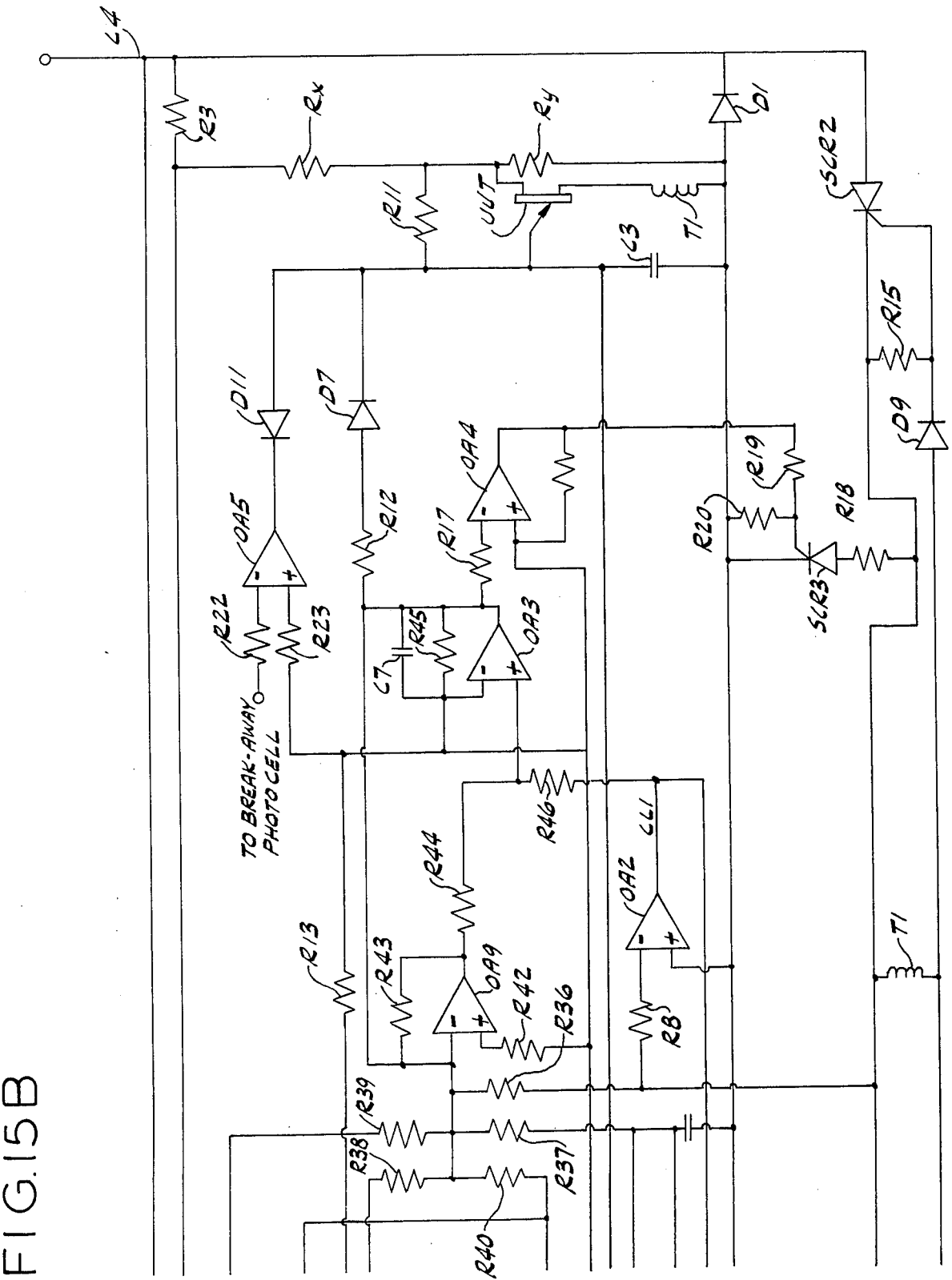

Referring now to FIGS. 15A and 15B, the main power leads L3 and L4 are shown at opposite sides of the drawings, it being apparent that they are connected to a conventional 117 v.a.c. power source. Lead L3 contains a fuse F1. A full-wave d.c. power supply suitable for supplying semiconductor components of the control is provided by diodes D1 and D2, resistors R2 and R3 and a zener diode D3. Thus, a regulated but pulsating d.c. potential, i.e., which goes periodically at zero as the a.c. supply voltage crosses through zero, is provided at a circuit node 701. A decoupling diode D4 provides this regulated potential to a d.c. bus L5. A filtering capacitor C1 is connected between lead L5 and lead L2 (see FIG. 9), the latter serving as a reference bus for the circuit. Integrated circuit packages U1, U2, and U3 are also shown connected across leads L5 and L2 to illustrate the manner of providing d.c. power for several operational amplifiers of the circuit shown at various locations within FIGS. 15A and 15B.

The principle components SCR1, SCR2, D1 and D2 of the power bridge circuit of FIG. 9 are also shown in FIGS. 15A and 15B wherein it will be apparent that door motor M is connected across power bus L1 and reference bus L2 in a polarity determined by the operation of sets of relay contacts Kop1 and Kop2, operation of which is explained more fully hereinbelow.

Signal E is generated by circuitry including an operational amplifier OA1 having its inverting input connected through resistors R4 and R5 to the smoothed, regulated d.c. bus L5 and its non-inverting input connected through a resistor R6 and diode D5 to a lead L6 which provides the pulsating d.c. voltage (indicative of zero-crossings of the a.c. supply voltage) to various parts of the circuit. A feedback resistor R7 is also connected from the output of operational amplifier OA1 to the anode of diode D5. As a result, said operational amplifier circuit OA1 operates as a bistable latch. For this purpose, a capacitor C2 is also adapted to provide an input signal for the non-inverting input of operational amplifier OA1. Capacitor C2, together with resistor R4, effectively differentiates a signal appearing across a further capacitor C3, the charging of which controls the operation of a unijunction transistor (UJT) designated UJT; which latter generates firing pulses for SCR1 and SCR2.

Accordingly, there are in effect two signals having distinctive waveforms applied to the input terminals of operational amplifier OA1. These are negative-going pulses provided by capacitor C2 when unijunction UJT is gated and the d.c. potential on bus L6 which periodically drops to zero at each zero-crossing of the a.c. supply voltage. As a consequence, each time unijunction UJT is gated for firing SCR1 of SCR 2, the output signal E of amplifier OA1 goes high and then remains so, being latched by feedback resistor R7, until zero-crossing of the a.c. supply voltage momentarily drops bus L6 to zero potential, causing diode D5 to become forward biased. When the potential on bus L6 then rises once more, the output signal E of operational amplifier OA1 remains latched in its low (zero voltage) condition until the next gating of unijunction UJT. The characteristic waveform of signal E will be seen in FIGS. 10B, 11B, and 12B which illustrate motor M in stalled condition, slow running, lightly-loaded condition, and fast running, lightly-loaded condition, respectively.

To the right of the above-described circuit is another operational amplifier OA2 whose output provides a signal $C_{L1}$. The inverting input of amplifier OA2 is connected through a resistor R8 to the main load or power bus L1 which supplies the output voltage from SCR1 and SCR2 to door motor M. The non-inverting input is tied to reference bus L2. Hence it will be apparent that the output of amplifier OA2 is a function of the voltage across door motor M, the output (which provides signal $C_{L1}$) going to zero volts whenever there is either a counter-electromotive force (CEMF) developed by door motor M or there is a voltage provided across said motor by triggering of SCR1 and SCR2 in the absense of any substantial CEMF. At any other moment, the absense of positive current into the non-inverting input of a operational amplifier OA2 forces its output high. Such operation is best illustrated by FIGS. 10, 11, and 12.

FIGS. 10A, 11A, and 12A show the positive signal (+) appearing on lead L1. Thus, in FIG. 10A, which represents a stalled condition of door motor M, only a gated portion of the power supply sinusoidal waveform appears on lead L1. In the slow running, lightly loaded condition represented by FIG. 11A, the signal on power bus L1 is shown as including a small step or "porch" produced by the counter-electromotive force (CEMF) produced by armature of door motor M and it will be apparent that the signal $C_{L1}$ (FIG. 11C) drops to zero with the beginning of this step CEMF. An even larger CEMF is produced in the lightly-loaded, but fast running condition represented by FIG. 12A. Thus, it will be seen that $C_{L1}$ (FIG. 12C) remains zero-valued so long as this condition remains. Accordingly, signal $C_{L1}$ is representative of any essentially free-wheeling mode of operation.

Referring now to the unijunction transistor (UJT) circuit, charging for capacitor C3 is provided from two paths. First, a resistor R11 provides a path for charging capacitor C3 from the pulsating d.c. potential divided by resistors Rx and Ry. This provides a ramp potential across capacitor C3. Another path is provided through a diode D7 and resistor R12 from the output of an operational amplifier OA3. The output of amplifier OA3 supplies a pedestal signal which, when added to the ramp signal provided by resistor R11, produces gating of unijunction UJT at a point during each half cycle of the a.c. supply voltage which corresponds to the potential of the pedestal. Thus, if the pedestal is high, triggering of unijunction UJT occurs earlier during each half cycle, producing earlier triggering of SCR1 and SCR2.

It should here be noted that the primary winding T1 of a pulse transformer is connected between one of base terminals of unijunction UJT and reference bus L2. The second winding T1' is shown having one side connected to power bus L1 and the other side through respective isolation diodes D8 and D9 to the gate terminals of SCR1 and SCR2, respectively, when gated (i.e., triggered) by a pulse supplied by the secondary winding T1' of the pulse transformer.

Unijunction UJT becomes conductive, i.e., triggers, providing a path through its base terminals and thereby supplying current to the primary winding T1 of the pulse transformer at a point when the voltage on its emitter, i.e., that to which capacitor C3 becomes charged, reaches a predetermined value which is dependent upon the intrinsic standoff ratio of the transistor.

Also responsive to the output voltage of operational amplifier OA3 is the braking circuit as shown in FIG. 13. This circuit comprises an operational amplifier OA4, whose inverting input is driven through a resistor R17 from the output of OA3, and also comprises a silicon controlled rectifier SCR3, the main (i.e., cathode and anode) terminals of which are connected in series with a resistor R18 having low resistance (e.g. 25 ohms) across power bus L1 and reference bus L2. The gate electrode of SCR3 is connected to the output of amplifier OA4 through a current limiting resistor R19. Operation of the braking circuit is in response to the output voltage of amplifier OA3. That is, if the output is high, the output voltage of amplifier OA4 is low and SCR3 is not gated into conduction. Thus, substantially no current can flow through resistor R18. However, if the output voltage is low, the output voltage of amplifier OA4 is increased sufficiently that a voltage drop across a load resistor R20 as a result of current through resistor R19 causes SCR3 to be gated into conduction. The resultant low resistance path across lead L1 and L2 has the effect of slowing the speed of door motor M.

A circuit for preventing further triggering of unijunction UJT includes an operational amplifier OA5 to the inverting input of which the panic break-away switch 94 is connected through a resistor R22. The output of amplifier OA5 is connected to the changing side of capacitor C3 through a diode D11. During normal operations of the door, light from a light emitting diode light source 95 illuminates the break-away photocell. Accordingly, the power supply potential provided to the non-inverting input of amplifier OA5 through a resistor R23 maintains the output of said operational amplifier high, causing diode D11 to be reverse biased. However, if doors 1,1' should be forced outwardly, as during an emergency (i.e., if they are broken away from their normal plane of operation) the break-away switch 94 is not permitted to receive light from diode 95 which is associated with it. Thus, the break-away switch 94 becomes conductive to provide a signal from a suitable power supply potential provided to the other side of its photocell by a lead L7. Another lead L8 supplies current through a current-limiting resistor R24 to diode 95. The resultant signal from the break-away switch 94 causes the output of operational amplifier OA5 to drop permitting diode D11 to become forward biased. Such immediately discharges capacitor C3 to preclude further operation of door motor M as is desirable should the doors 1,1' be broken away.

At T2 is designated the primary winding of a step-down transformer, this winding being connected between the a.c. power leads L3 and L4. A conventional surge suppressor SS1 is connected across said transformer winding R2 to protect against the introduction of power line high voltage surges into the circuitry. It may be seen that a similar surge suppressor SS2 is connected in parallel with door motor M for similar reasons. The secondary winding T2' of this step-down transformer, preferably a 12-volt winding, is connected in series with a pair of resistors R25 and R26 across a pair of leads L10 and L11 which extend to switch mat 501; it being understood that said switch mat 501 completes the circuit when suitable weight is placed thereon to provide a relatively low level a.c. voltage across resistor R26. This a.c. voltage is shunted on alternate half-cycles of the a.c. supply by a suitable diode D12. During other alternate half-cycles, this low a.c. voltage energizes a light-emitting diode (LED) designated LED1 forming part of opto-isolater OI1. The latter includes a photocell PC1 suitably coupled to diode LED, its resistance decreasing when illuminated thereby.

Weight on switch mat 501 permits a signal from power supply bus L5 to be provided through a resistor R27 to the non-inverting input of an operational amplifier OA6 forming part of the timer circuit 503 (see FIG. 13). The inverting input of the latter is biased by power supply bus L5 through potentiometer R1 and a resistor R28. A capacitor C5 is connected between the output and inverting input of OA6 so that this operational amplifier is, in effect, adapted to integrate negatively at a rate determined by the setting potentiometer R1. Operation of this timing circuit is as follows: - closure of the contacts of switch mat 501 causes the output of operational amplifier OA6 to go high, charging capacitor C. This ouput voltage is decreased by negative integration resulting in discharging of capacitor C5 beginning as soon as weight is taken off switch mat 501.

Connected to the output of integrating amplifier OA6 through a resistor R29 is the inverting input of an operational amplifier OA7 connected as a level discriminator. As long as the output of amplifier OA6 remains above a predetermined level, the output of discriminator amplifier OA7 remains low. This output goes high, however, when the output of amplifier OA6 drops below the predetermined discrimination level determined by amplifier OA7.

Between the output of operational amplifier OA7 and the unfiltered power supply bus L6 is the coil of relay Kop. Thus, it will be apparent that when the output of OA7 is high, the coil of relay Kop is energized. As noted earlier, relay Kop determines the direction of movement of doors 1,1'; that is, when relay Kop is deenergized, the relay contacts Kop1 and Kop2 are in the position shown, in which door motor M rotates, when energized, in a direction for opening the doors 1, 1'. However, when the coil of relay Kop is energized, the relay contacts transfer to the opposite position in which door motor M rotates, when energized, in a direction for closing doors, 1,1'.

A further operational amplifier OA8, constituting part of the re-open computer 507 shown in FIG. 13, has its non-inverting input connected through a resistor R30 to the output of operational amplifier OA7. It will also be apparent that the signals E and $C_{L1}$ are provided to this input through resistor R31 and R32. The non-inverting input of amplifier OA8 is biased to the fileted power supply bus or line L5 through resistor R33. A capacitor C6 interconnected between the output of amplifier OA8 and the non-inverting input of said operational amplifier provides for a slight negative integration characteristic in order to provide a time delay type of operation similar to the circuit provided by operational amplifier OA6.

Operation of this re-open circuit is as follows: - If motor M should be stalled by blockage of the doors or by a person seeking to prevent the doors from closing, characteristic waveforms of the key signals E and $C_{L1}$ are as shown in FIGS. 10B and 10C, respectively; when such a condition occurs, the output of operational amplifier OA8 is driven high. This provides a signal through a resistor R34 to the non-inverting input of operational amplifier OA6, causing a time delay cycle to be reinitiated by the setting of potentiometer R1. Accordingly, operational amplifier OA7 deenergizes relay Kop to once more open doors 1,1' for the time delay period.

Referring to FIG. 15B, an operational amplifier OA9 constitutes the primary component of the speed computer circuit shown in FIG. 13. As will be seen, various signals are supplied to the inverting input of operational amplifier OA9 through a plurality of resistors R36-R40, inclusive. All of these input paths may be regarded as "slowdown"paths; that is, increasing the level of a signal supplied through any of these resistors and tends to slow down door motor M. Such signals are compared by operational amplifier OA9 to a predetermined reference signal constituted by the current supplied to the non-inverting input by a resistor R42. Negative feedback for controlling the gain of this operational amplifier is provided by a resistor R43. The output of amplifier OA9 is connected through a resistor R44 to the non-inverting input of operational amplifier OA3.

To understand the latter circuit it is also necessary to describe two additional circuits. A first one of these has an operational amplifier OA10 to the inverting input of which is connected one side of a back-check sensing photocell PCBC (forming the back check sensor 89 of FIG. 13). The output of operational amplifier OA10 is connected through resistor R39 to the inverting input of amplifier OA9. A second of these circuits comprises another operational amplifier OA11 having one side of a photocell PCLS of the latch sensor 90 connected to its inverting input and having its output connected through resistor R40 to the inverting input of amplifier OA9. It should also be noted that the output of operational amplifier OA11 is connected through a resistor R45 to the inverting input of operational amplifier OA8 for inhibiting the timer reset feature when the doors reach the fully closed position.

Operation of the speed control operational amplifier circuit (OA9) is as follows: - Door motor M is energized as earlier noted, by a signal on main power bus L1 provided by gating of SCR1 and SCR2 of the power bridge. Also, if operating door motor M generates a counter-electromotive force or potential CEMF which also appears on lead L1. This composite voltage which is shown in FIGS. 10A, 11A, and 12A where it is designated (+), is provided through resistor R36 to the inverting input of operational amplifier OA9. The latter effectively sums this signal with other signals supplied through resistors R37-R40, and compares them with the reference current or signal provided by resistor R42 to the non-inverting input. If the motor feedback signal provided by resistor R36 increases because of higher motor speed or greater power provided to the motor by the SCRs, the output of this operational amplifier drops. As will become apparent, this negative feedback signal thus has the effect of "phasing back" the firing of SCR1 and SCR2; that is, it will reduce the firing or gating angle (i.e., period during which the respective SCR is conductive) to maintain motor M substantially at a predetermined operating speed, dependent upon the magnitude of other "slow down" signals.

A measure of motor speed control is provided also by the signals $C_{L1}$ and E supplied through respective isolation diodes D14 and D15 and thence through resistor R37. Thus, these two signals have a composite effect in reducing the voltage applied to the motor during stalled conditions.

Another slow-down signal is provided by operational amplifier OA7 when its output goes high to energize relay Kop for closing doors 1,1'. When this occurs, a signal through resistor R38 reduces the output level of operational amplifier OA9 so that doors 1,1' will close at a slower rate than that at which they open.

It is also desirable to slow the speed of the door as it reaches its almost open, and its almost latched (closed) positions. Thus, operational amplifier OA10 supplies a slow-down signal through resistor R39 when its output goes high as the back-check photocell PCBC senses that the doors are nearly opened.

Similarly, operational amplifier OA11 provides a signal through resistor R40 for slowing motor operation, but biased by a signal from power supply bus L5 through resistors R33 and R45, when the latch sensing photocell PCLS senses that doors 1,1' are approaching the latched or closed position.

Since the output of operational amplifier OA9 is connected through resistor R44 to the non-inverting input of operational amplifier OA3, increase in the level of the output of OA9 causes increase of the pedestal signal by which capacitor C3 is charged, and decrease in the output of amplifier OA9 causes a decrease of the pedestal. Thus, it will be apparent that the power supplied to door motor M by triggering of SCR1 and SCR2 varies as a direct function of the output level of operational amplifier OA9.

The provision of a capacitor C7 and a feedback resistor R45 is parallel between the output of operational amplifier OA3 and its inverting input causes this inverting amplifier to exhibit a modest integration characteristic for removing the ripple from the pedestal signal.

It should be noted that the output of operational amplifier OA2 which generates signal $C_{L1}$, with the non-inverting input of OA3 by means of a resistor R46 having approximately twenty times the resistance of resistor R44. This arrangement is provided so that signal $C_{L1}$ will influence triggering of the power bridge SCRs if the motor stalls. Triggering of the SCRs is phased back to provide only a "hold back" current, established by $C_{L1}$ and R46, to the motor until the time delay circuit causes reversal of the door direction or the door blockage is removed, as the case may be.

Accordingly, this speed control circuitry arrangement is operative in a sense tending normally to cause the motor, and hence the door, to maintain a predetermined speed unless the door meets substantial resistance to movement caused by blockage in which case the change in the counter-electromotive force developed by the motor causes a change in signal $C_{L1}$ such that motor torque is reduced automatically so long as the door blockage is present.

Figure 16A:
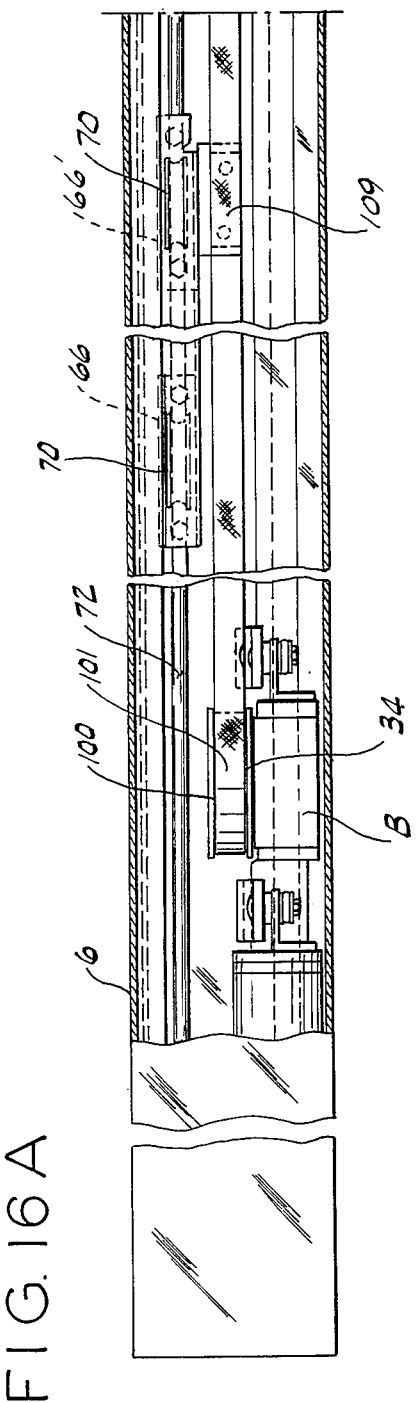
FIGS. 16A and 16B jointly constitute a top plan view of the header with the cover panel removed, being taken substantially as indicated by the arrow in FIG. 1, but illustrating another form of power transmission for the sliding door system of the present invention.
Figure 17A:
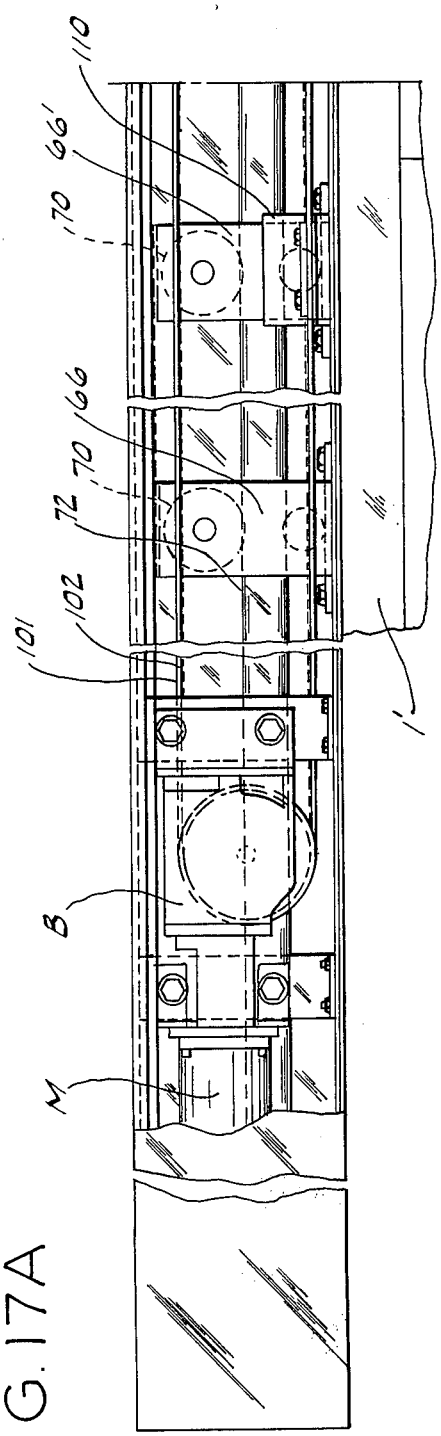
FIGS. 17A and 17B jointly constitute a vertical sectional view taken on the line 17—17 of FIGS. 16A and 16B.
Figure 16B:
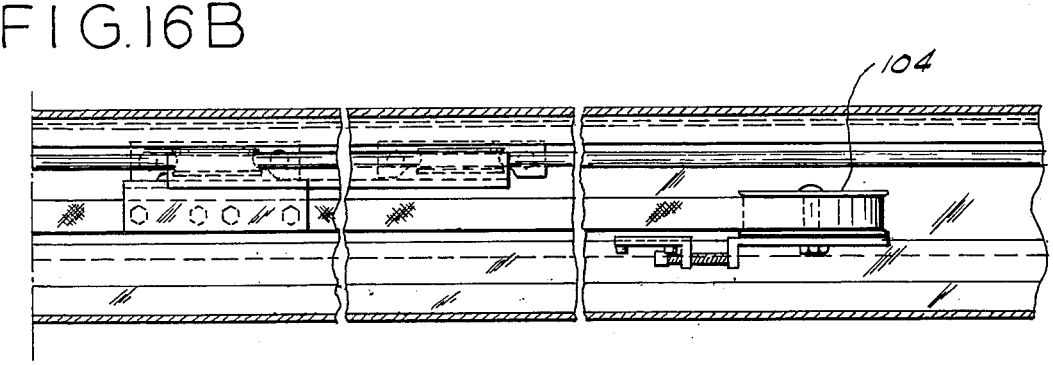
Figure 17B:
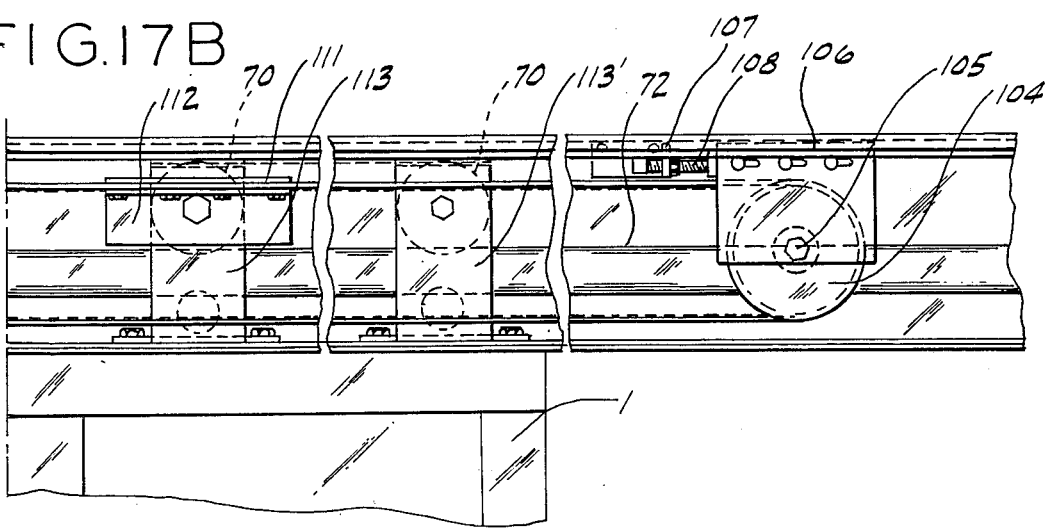

Turning now to FIGS. 16 and 17, A' designates an automatic sliding door system which is fundamentally of like character as system A above described, but, as will be shown hereinbelow, differs in incorporating a belt arrangement for motion transmission in lieu of the fixed roller chain section of said system A. Accordingly, since system A' embodies various components identical with system A, the same will bear like reference numerals.

Shaft 34 of gearbox B mounts an operator sprocket 100 about which extends a transmission or timing belt 101, as fabricated of molded rubber or the like, and having upper and lower courses 102, 103, respectively; said belt 101 progressing lengthwise of housing 6 for engagement about the periphery of an idler sprocket 104 mounted upon a shaft 105, which latter is engaged in a plate 106 depending from a mounting bracket 107 suitably affixed to adjacent portions of housing 6. Said mounting bracket 107 incorporates an adjustment screw 108 by operation of which plate 106 may be moved in a direction lengthwise of housing 6 so as to control the tension upon belt 101. In its lower course 103, belt 101 is securely engaged to a belt lock 109 fixed, as by an angle bracket 110, to door carrier 66', which latter, as described above, is engaged to door 1'. Belt 101 in its upper course 102 is rigidly secured to a belt lock 111 mounted as by a bracket 112 to a door hanger 113 of like construction as door hangers 66,66', but being fixed at its lower end to the upper edge of door 1 to which is also secured the lower end of a companion hanger 113' disposed between hanger 113 and idler sprocket 114. Said hangers 113,113' replace the elongated door carrier 84 of system A above described. Each of said door carriers 113,113' mount rollers 70 for traversing movement along track 72. There are two door hangers for each door thereby providing appropriate balance and with door 1' being connected to the lower course 103 of belt 101 and door 1 being engaged to the upper course 102 of said belt 101.

Upon energization of motor M, drive sprocket 100 will be caused to rotate in a clockwise direction as viewed in FIG. 17 to effect door opening and upon reverse rotation will cause door closing. As indicated hereinabove, the belt transmission of system A' is utilized in conjunction with the same electronic control means hereinabove described in conjunction with system A.

Having described our invention what we claim and desire to obtain by Letters Patent is -

1. An electronic door control system comprising a d.c. electric motor rotatable in one direction for opening a door and in the opposite direction for closing the door, at least one semiconductor device for supplying d.c. power to the motor from an a.c. power source when said device is rendered conductive, polarity switching means for selecting the polarity of the d.c. power supplied to the motor thereby for controlling its direction of rotation, means for sensing the presence of an object near the door and operative to enable the conductivity of said semiconductor device and to cause the polarity switching means to select a first polarity of d.c. power supplied to the motor for a predetermined period thereby to open the door, means for causing the polarity switching means to select a second polarity of d.c. power supplied to the door after said door is opened thereby to close the door, and speed control means responsive to counterelectromotive force developed by the motor during its rotation for controllably varying the conductivity of said semiconductor device, said speed control means being operative in a sense tending normally to cause motor rotation to be maintained at a predetermined speed thereby to cause movement of the door at a predetermined speed.

2. An electronic door control system as set forth in claim 1 wherein said speed control means is operative also in response to change in said counter-electromotive force caused by door blockage to effectively cause reduction of the conductivity of said semiconductor device, whereby motor torque is reduced to prevent damage so long as said door blockage is present.

3. An electronic door control system as set forth in claim 1 further comprising means, interconnected with said speed control means, for sensing a nearly-closed position of said door, and operative when said nearly-closed position is sensed for causing said speed control means to reduce the conductivity of said semiconductor device, whereby door speed of movement when closing is reduced when said nearly-closed position is sensed.

4. An electronic door control system as set forth in claim 3 further comprising means, interconnected with said speed control means, for sensing a nearly fully-opened position of said door, and operative when said nearly fully-opened position is sensed for causing said speed control means to reduce the conductivity of said semiconductor device, whereby door speed of movement when opened is reduced when said nearly fully-opened position is sensed.

5. An electronic door control system as set forth in claim 2 further comprising time delay cycle means for controlling said polarity switching means, said time delay cycle means being operative when an object is sensed by said sensing means for causing said polarity switching means to select a first polarity of the d.c. power supplied to said motor during a predetermined time delay interval for door opening and to select an opposite polarity of said d.c. power for door closing after said predetermined time delay interval has elapsed, whereby said door opens and remains opened for said time delay interval when an object is sensed by said sensing means.

6. An electronic door control system as set forth in claim 1 comprising re-open circuit means for causing said time delay cycle means to initiate said predetermined time delay interval for door opening in response to door blockage, whereby said door is re-opened for said time delay interval upon said door blockage.

7. An electronic door control system as set forth in claim 1 comprising door break-away means for disabling said semiconductor device in response to said door being broken away from a normal operating position, whereby normal door opening or closing operation is prevented if said door is broken away from its normal operating position.

8. An electronic door control system as set forth in claim 1 wherein said semiconductor device comprises a triggerable current switching device, said system including triggering means operative when enabled for triggering said semiconductor current switching device into conduction during at least a portion of the a.c. power oscillation cycle, said speed control means effectively controllably varying the conductivity of said semiconductor current switching device by controllably varying said portion of the a.c. power oscillation cycle during which said semiconductor current switching device is triggered into conduction.

9. An electronic door control system as set forth in claim 8 additionally comprising a further triggerably semiconductor current switching device connected in a series circuit including a resistance across said motor, said further current switching device becoming conductive when triggered and thereby effectively connecting said resistance across the motor for causing rotation of the motor to be braked, and further triggering means for triggering said further current switching device responsive to said speed control means when motor rotation is greater than said predetermined speed.

10. An electronic door control system as set forth in claim 2 wherein said triggering means comprises a unijunction transistor, a timing capacitor interconnected with said unijunction transistor for causing said unijunction transistor to become conductive when said capacitor is charged to a predetermined voltage, said unijunction transistor upon becoming conductive causing triggering of said current switching device, a first charging circuit for charging said capacitor with a first charging signal from said a.c. power source during each a.c. power oscillation cycle, said speed control means comprising a further charging circuit for further charging said capacitor with a further charging signal during said a.c. power oscillation cycle, the magnitude of said further charging signal being variable to determine the portion of the a.c. power oscillation cycle during which said currentswitching device is triggered with conduction, and door breakaway means for disabling said triggering means in response to said door being broken away from a normal operating position, whereby normal door opening or closing operation is prevented if said door is broken away from its normal operating position, said break-away means comprising a circuit for causing discharging of said capacitor.

11. An electronic door control system as set forth in claim 10 comprising means for generating a feedback signal which is a function of the counter-electromotive force developed by said motor, and circuit means for supplying said feedback signal to said further charging circuit in a sense tending to cause said further charging circuit substantially to reduce the magnitude of said further charging signal if said feedback signal changes as a result of door blockage stalling said motor, whereby only a reduced d.c. power level is supplied for energizing said motor during said door blockage.

* * * * *